June 13, 1950  E. H. LACEY  2,511,439
HYDRAULIC LOADER FOR TRACTORS
Filed April 5, 1946
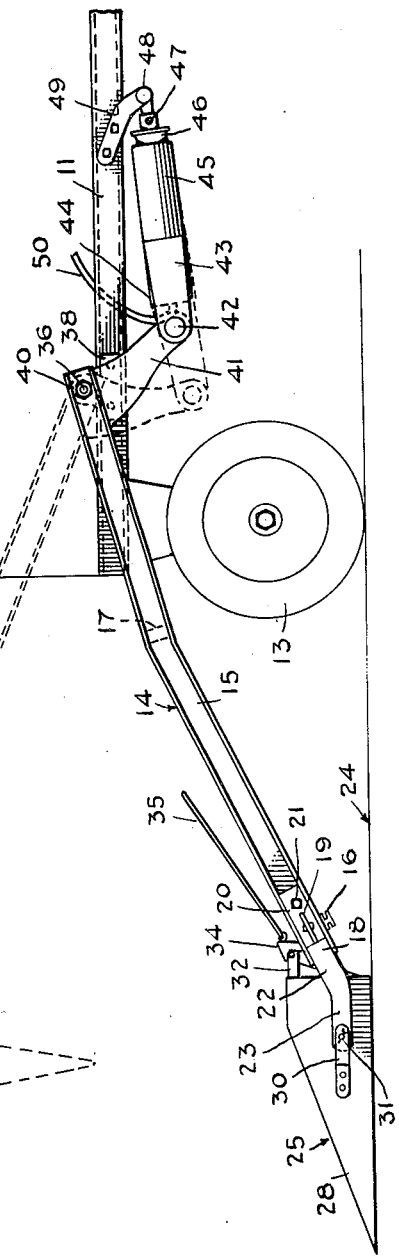
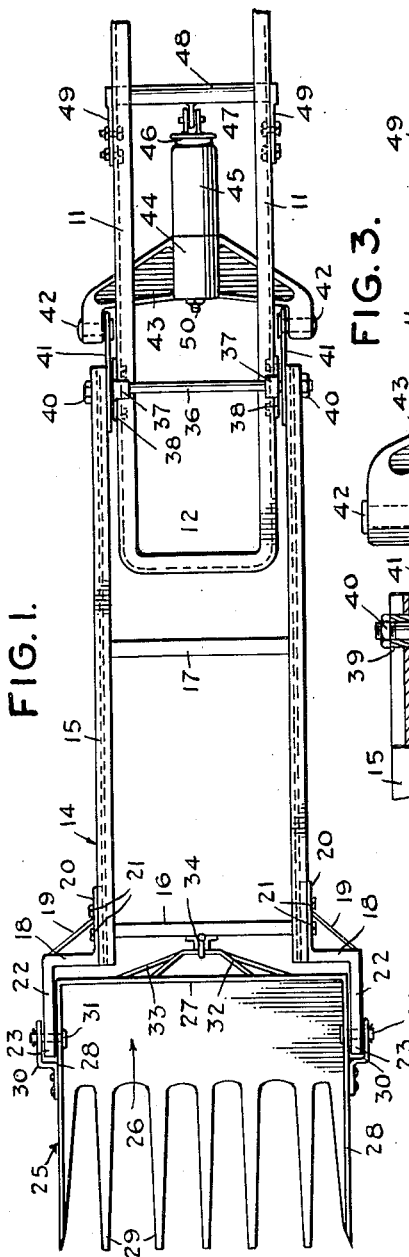
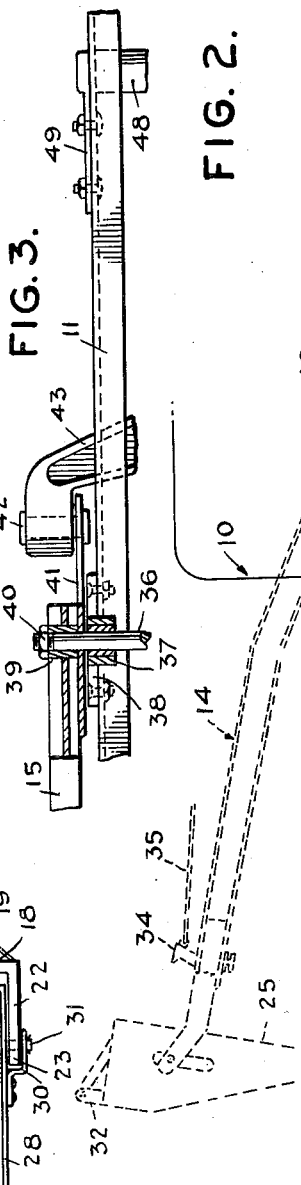
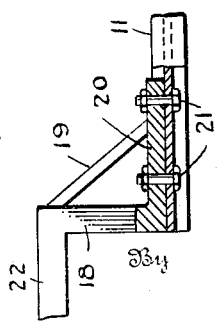
Inventor
Edward H. Lacey
By
A. M. Freeman
Attorney Patented June 13, 1950

2,511,439

UNITED STATES PATENT OFFICE 2,511,439

HYDRAULIC LOADER FOR TRACTORS

Edward H. Lacey, Sioux Falls, S. Dak.

Application April 5, 1946, Serial No. 659,949

2 Claims. (Cl. 214—140)

This invention relates to lifter and loader attachments for farm tractors and the like.

It has for one of its objects to improve upon and make more practical and efficient, devices of such character for general lifting and loading purposes, more particularly on a farm and the like.

A special object is to simplify and lighten the general construction and arrangement of the complete attachment and provide for an easy and practical operation and control of the same in use and at a minimum cost without sacrificing strength and durability thereof.

Another object is to produce a characteristic attachment structure, possessing the above noted advantages, which is readily applicable to and removable from ordinary farm tractors and the like of different standard makes and forms without necessitating any appreciable alteration in either the tractor or carrier vehicle or in the attachment itself.

Other objects and advantages to be attained will hereinafter more fully appear in the following description.

In the accompanying drawings illustrating a practical but non-limiting exemplification of the invention:

Figure 1 is a top plan view of the forward portion of a conventional tractor frame with an adaptation of a lifter and loader attachment applied thereto in accordance with the invention;

Figure 2 is a side elevational view of the parts shown in Figure 1;

Figure 3 is a fragmentary view, partly in top plan and partly in longitudinal section, illustrating details of the mounting and operating connections between the pusher and lifter frame and the actuator element of the device; and Figure 4 is a fragmentary detail view, partly in top plan and partly in longitudinal section, of a bracket element for the mounting of a gatherer element on the forward end portion of the pusher and lifter frame.

Referring now to the drawings in detail, the numeral 10 designates generally, the forward portion of a conventional farm tractor or the like, the same comprising a body frame or chassis including the usual parallel pair of longitudinal side members 11 which are rigidly connected at their forward ends by a transverse member 12 (see Figure 1). The forward portion of the body frame or chassis is mounted on the usual steering wheel or wheels indicated at 13 (see Figure 2).

Hingedly mounted on the forward portion of the body frame or chassis is a lifter and loader attachment designated generally and as a whole by the numeral 14. As shown, this attachment 14 comprises a rigid and stable pusher and lifter frame including the pair of parallel longitudinal side members 15, preferably of I-beam cross section, spaced laterally apart and cross-connected adjacent their forward ends by a rigid transverse brace member 16 and substantially midway thereof by a similar transverse brace member 17 (see Figure 1). Obviously, the entire pusher and lifter frame may be formed in any suitable or approved manner, that is to say, it may be cast integrally in its entirety or else assembled or built up in separate members or sections, such as the side rails 15 and the cross braces 16 and 17, which latter two may be, obviously, securely and rigidly attached to each side rail by bolting, riveting, welding or any other approved procedure which gives the required strength and rigidity to the frame structure.

At the forward end of each frame side rail 15 is a substantially Z-shape bracket member 18 which is reinforced by a diagonal brace 19. The bracket member 18 has one of its legs 20 bolted, as at 21, to the companion side rail 15. As shown more clearly in Figure 2, the other, outwardly offset, leg member 22 of each bracket element 18, has its forward portion 23 turned upwardly at a slight angle so that, in the normal, full lined, lowered position of the pusher and lifter frame 14, as shown in Figure 2, said forward leg portion 23 extends, in a substantially horizontal plane, close to the ground line indicated at 24.

Hingedly mounted between the outwardly offset legs 22 of the bracket elements 18, so as to swing vertically about a horizontal axis, is a gatherer element, designated generally by the element 25. As shown, this element 25 is of a scoop or shovel type, having the solid bottomed rear body portion proper 26 provided with an upstanding, transverse rear wall 27 and opposite side walls 28. The top edges of the side walls 28, as shown, are inclined forwardly and downwardly and terminate in a point at the forward end of the gatherer element 18. Between the side walls 28 of the gatherer element, a plurality of parallel, tapered tines 29 extend forwardly from the transverse edge of the solid bottom 26 and terminate at an imaginary transverse line at the forward end of the gatherer element 25 (see Figure 1).

The pivotal attachment of the gatherer element 25 may be effected in any approved and desirable manner. As shown, the side walls 28 are provided on their outer faces with outwardly offset angular brackets 30 which respectively straddle the forward end portions 23 of the bracket elements 18. Said brackets 30 are pivotally attached by bolts 31 which are inserted through alined apertures provided therefor in said brackets 30, leg portions 23 of the bracket elements 18 and the adjacent portions of the side walls 28 of the gatherer element 25.

As shown, the pivotal axis of the gatherer element 25 is transversely of the element and located more nearly adjacent the rear end of the element rather than in an approximate central balancing position across the element. Thus, if the gatherer element is not held in a fixed position on the pusher and lifter frame 14, the element will gravitate about its axis and move to a substantially vertical position as shown by broken lines in Figure 2. This is the dumping position of the gatherer element in use, as will be later more fully described. However, the gatherer element 25 is normally held releasably in a substantially horizontal position as shown in full lines in Figure 2, and it remains in such relative substantially horizontal position even when the pusher and lifter frame 14 swung upwardly to a raised operated position in use as indicated by broken lines in Figure 2 and until the element 25 is released by manually controlled and operated means to be now described.

As shown, a keeper bracket 32 comprising a polygonal strap-like bracket, reinforced by a polygonal stay 33, is provided on the back face of the rear wall 27 of the gatherer element 25. This keeper bracket 32 is normally engaged by a suitable self-catching latch element 34 which is mounted on the forward cross brace member 16 of the pusher and lifter frame 14. A pull cord or chain 35 is attached at its forward end to said latch element 35 (see Figure 2) and it is carried, in use, obviously back to a place (not shown) on the tractor or carrier vehicle 10 within convenient reach of the operator.

The pusher and lifter frame 14 may be pivotally attached to swing vertically about a horizontal axis on the forward portion of the tractor or carrier vehicle 10 in my approved manner. As shown, the attachment is effected, both stably supported as well as hingedly, by a removable shaft 36 which has its opposite end portions extended and rotatably fitted in bearing portions 37 of bracket members 38 bolted or otherwise securely attached to adjacent outer face portions of the longitudinal body frame or chassis members 11 of the tractor or carrier vehicle 10.

The rear end portions of the longitudinal side members 15 of the pusher and lifter frame 14 are provided with bearings 39 in which the outer end portions of the removable shaft 36 are supportingly journalled. The shaft 36 is held removably in the assembly by nut elements 40 provided on the ends thereof.

The pusher and lifter frame 14 is controlled, raised and lowered by fluid pressure power-means to now be described.

As shown, each longitudinal side member 15 of the pusher and lifter frame 14 is provided at its rear end portion with a downwardly extending angular lever bracket 41 which is bolted, riveted, welded or otherwise securely and rigidly attached to the member 15. Hingedly attached at its opposite end portions to the lower ends of the respective lever brackets 41, as at 42, is a stout yoke-like actuator element 43. The central portion 44 of this actuator element 43 is either formed integrally with or securely attached to the forward end portion of a power cylinder 45 which is sleeved longitudinally slidable on a piston element 46. The rear end of the piston element 46 is hingedly attached, as at 47, to a stable cross bar 48, which latter is supportedly secured at its opposite ends to bracket members 49 provided on the adjacent outer face portions of the longitudinal side members 11 of the body frame or chassis of the tractor or carrier vehicle 10.

Communicably attached to the forward end of said power cylinder 45 is a flexible pressure fluid conductor pipe 50 (see Figure 2). This conductor pipe 50, in practice, leads from a source of fluid pressure (not shown) as usually provided as a part of conventional present day equipment on farm tractors and the like. The pipe 50 is also obviously provided, in practice, with cut-off and controlling valves and appurtenances (not shown) for regulating and controlling the supply of fluid under pressure to said power cylinder 45. Said flexible pipe 50 in supplying pressure fluid to the forward end of the cylinder 45 and acting upon the adjacent end of the piston 46 in the cylinder, and the rear end of the piston being pivotally attached, at 47, to the frame cross bar 48 which is supported by bracket members 49, not only causes a forward longitudinal movement of said cylinder 45 on the piston element 46 but the pipe yields to the combined endwise and swinging movement of the cylinder on and with the piston element.

The attachment of the persent invention is of simple yet practical and durable construction and arrangement and, obviously, readily applied to and removed from a farm tractor or the like. So, too, while the device is primarily produced for use more particularly on farms as a digger, gatherer, transporter and loader, it is equally adaptable for use in other places and is capable of use in general lifting purposes, such as for example, jacking up vehicles for tire removals and replacements and lifting for vehicle body removal and replacement and the like.

It is noted that while the particular construction and arrangement shown, wherein a push type of fluid pressure power element such as the cooperative cylinder 45 and piston 46 is provided, the general form and arrangement of the pusher and lifter frame 14 and the gatherer element 25 may remain substantially as that shown, but a pull type of fluid pressure power element will be substituted for the push type shown. That is to say, the lever brackets 41 can remain downwardly extended from the pusher and lifter frame longitudinal members 15 substantially as shown in Figure 2 of the drawing, but the pivotal axis 36 of the frame will, of course, be shifted rearwardly from the position now shown, and the yoke-like actuator element, power cylinder and piston element reversed in the application of the same to the lever brackets 41, with the pivotal connection 47 of the power unit shifted to a position forwardly of the pivotal axis 36 of the pusher and lifter frame. This modification being obvious the same is not shown in detail in the drawing.

The herein illustrated and described structure is only one practical exemplification of the invention. The same admits of modification and change within the purview of the appended claims. The invention, therefore, is not limited to the specific construction and arrangement shown.

What is claimed is:

1. A lifter and loader attachment for tractors and the like including, a detachable cross-bar rigidly secured to and bridging the side rails of a tractor frame, a detachable transverse shaft carried by the tractor frame forwardly of said cross bar and having each of its free ends terminating outwardly of the sides of the tractor frame, a rigid pusher and lifter frame having side members straddling the tractor frame and having its inner ends pivotally connected one each to one each of the outwardly extending ends of the transverse shaft, a pair of spaced crank arms carried by and depending from the inner end of the pusher and lifter frame, a fluid power means having one of its ends detachably hinged to said cross-bar, a yoke member connecting the opposite end of said power means and said depending crank arms of the pusher and lifter frame to raise and lower the latter upon actuation of said power means, and a self-dumping gathering element mounted upon the outer end of the pusher and lifter frame.

2. A lifter and loader attachement for tractors and the like including, a detachable cross-bar rigidly secured to and bringing the side rails of a tractor frame, a detachable transverse shaft carried by the tractor frame forwardly of said cross bar and having each of its free ends terminating outwardly of the sides of the tractor frame, a rigid pusher and lifter frame having side member straddling the tractor frame and having its inner ends pivotally connected one each to one each of the outwardly extending ends of the transverse shaft, a pair of spaced crank arms carried by and depending from the inner end of the pusher and lifter frame, a yoke member pivotally connected between said spaced crank means, a power cylinder carried by said pivoted yoke, a piston and piston rod operatively associated with said cylinder, said piston rod being detachably hinged to said cross-bar, whereby actuation of the piston and piston rod serves to raise and lower the pusher and lifter frame, and a self-dumping gathering element mounted upon the outer end of the pusher and lifter frame.

EDWARD H. LACEY.

REFERENCES CITED

The following references are of record in the file of this patent:

UNITED STATES PATENTS

| Number | Name | Date |
| --- | --- | --- |
| 2,286,723 | Frost | June 16, 1942 |
| 2,290,738 | Chadwick, Jr. | July 21, 1942 |
| 2,377,112 | Strunk | May 29, 1945 |
| 2,404,820 | Wuertz et al. | July 30, 1946 |
| 2,412,570 | Ender | Dec. 17, 1946 |